United States Patent [19]

Revells et al.

[11] 4,352,221

[45] Oct. 5, 1982

[54] APPARATUS FOR WASHING CURVED SHEETS

[75] Inventors: Robert G. Revells; John N. Eggert, both of Toledo, Ohio

[73] Assignee: Libbey-Owens-Ford Company, Toledo, Ohio

[21] Appl. No.: 259,683

[22] Filed: May 1, 1981

[51] Int. Cl.³ .......................................... A46B 13/02
[52] U.S. Cl. ........................................ 15/77; 15/179
[58] Field of Search ................... 15/21 D, 77, 88, 102, 15/179, 181, 182, 104.04

[56] References Cited

U.S. PATENT DOCUMENTS 2,312,186  2/1943  Paddock et al. .................... 15/77
2,781,534  2/1957  Cochran et al. .
3,390,413  7/1968  French et al. ...................... 15/77

FOREIGN PATENT DOCUMENTS 381331  10/1932  United Kingdom ................. 15/179
1314838  7/1970  United Kingdom .

Primary Examiner—Edward L. Roberts
Attorney, Agent, or Firm—Collins, Oberlin & Darr

[57] ABSTRACT

An apparatus for washing curved glass sheets comprising a cluster of brushes including a pair of upper brushes and a lower brush mounted above and below, respectively, the horizontal path of movement of the glass sheets. Each brush is formed into an arcuately shaped configuration conforming to the shape of the glass sheets being processed. Each brush is mounted on a composite shaft having an arcuately shaped inner core and an outer, driven, flexible sleeve assuming the shape of the core and rotatable thereabout.

10 Claims, 7 Drawing Figures

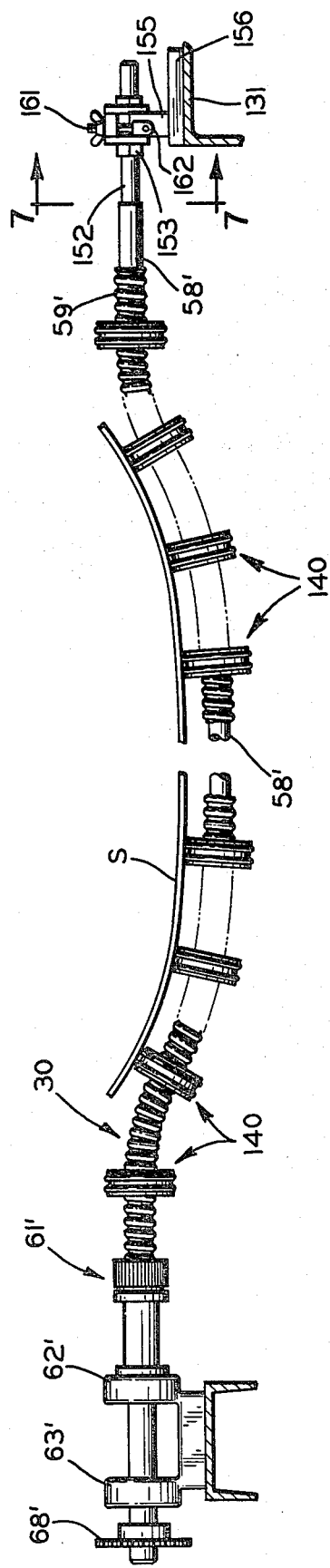
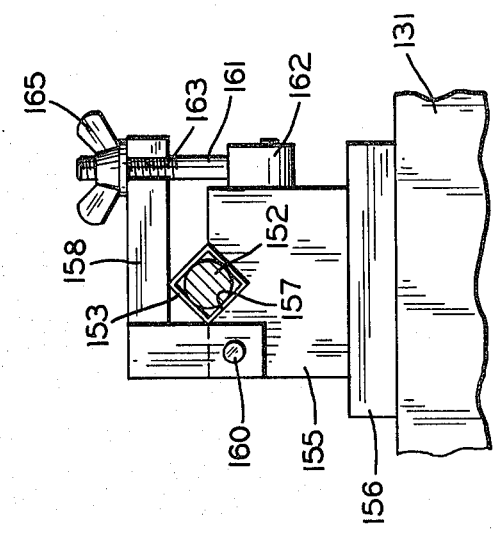
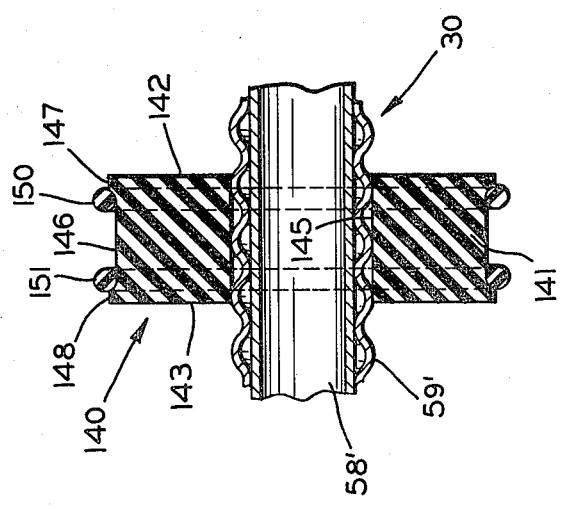

APPARATUS FOR WASHING CURVED SHEETS

BACKGROUND OF THE INVENTION

The present invention relates generally to the cleaning of sheet articles and, more particularly, to an improved apparatus for washing specially configurated, curved glass sheets.

Bent or curved sheets of glass are commonly used as glazing closures in vehicles such as automobiles and the like. Sometimes, the bent or curved glass sheets forming these closures must be thoroughly washed or cleansed during the production thereof. For example, in the production of laminated safety glass windshields, two separate but complementary-shaped glass sheets are bonded to a plastic interlayer disposed therebetween to form the laminated structure. Before assembly of these component parts, the opposite surfaces of each glass sheet must be thoroughly washed and dried. Conventionally, the sheets are conveyed in an upright attitude through an enclosure wherein water or other cleaning fluids are sprayed onto the opposite surfaces of the sheets for washing the same. The sheets are then dried and advanced to an assembly room where the plastic interlayer is sandwiched between the two sheets of glass for laminating.

In another application, finished glazing closures forming automotive sidelights, backlights, and/or windshields having scratches or other surface imperfections often can be enlarged by rubbing or polishing the scratches out with a suitable abrasive compound. These reconditioned sheets must then be thoroughly cleansed, either manually or by conventional off-line washers, to remove all traces of the rubbing compound. Prior known washers include a conveyor for advancing wetted glass sheets in a horizontal path between elongated rotary brushes mounted on straight shafts extending transversely of the path of movement of the glass sheets or segmented brushes disposed in a staggered array, each of which engages only a portion of the glass sheets, but which collectively cover the entire width of the sheets passing therebetween. Where curved glass sheets are processed, the radial ends of the bristles forming the brushes are trimmed to define a contour complementary to the transverse configuration of the curved glass sheets. However, when differently shaped sheets are to be processed, these contoured brushes must be replaced by differently contoured brushes. It can be appreciated that the replacement of the several brushes each time a run of differently curved glass sheets is washed involves time-consuming labor as well as washer down-time to materially increase production costs. Moreover, a large inventory of differently sized and contoured brushes is necessary in order to accommodate the many varied shapes formed in these glazing closures.

In addition to the windshields, backlights and sidelights, recent automotive designs have also included sunroofs, i.e., specially configured glass sheets that are fitted into the roof of a vehicle and often extend downwardly at a relatively sharp curvature into a portion of the upper side surfaces of the vehicle. These sunroofs generally are coated with a film of material adapted to reflect the major portion of the solar heat otherwise entering the interior of the vehicle while transmitting substantially all the light therethrough. Before coating these unusually shaped glass sheets, they must be absolutely clean and free of all foreign matter such as particulates, dust, human oils transmitted by manual handling etc. so that the coating material will properly adhere to the glass surface. Conventionally, these odd shaped glass sheets have been washed manually by hand to assure absolute cleaning. Again, such a manual operation seriously impairs efficiency in a mass production operation and adds materially to production costs.

SUMMARY OF THE INVENTION

Accordingly, it is an object of the present invention to overcome the above shortcomings by providing an improved apparatus for thoroughly and efficiently washing curved glass sheets.

It is another object of this invention to provide a new and useful washing apparatus especially suited for cleansing curved glass sheets and provided with a plurality of elongated, arcuately curved brushes having glass engaging surfaces complementary to the curvature of the sheets being washed.

It is a further object of the present invention to mount the foregoing brushes on arcuately curved shafts each comprised of a fixed inner core member and an outer rotatable, driven sleeve.

The foregoing and other objects, advantages and characterizing features of this invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIG. 5 is a front elevational view of one of a series of conveyor rolls used in conjunction with this invention;

FIG. 6 is a longitudinal sectional view, on an enlarged scale, of one of a series of disc assemblies mounted on the conveyor roll of FIG. 5; and FIG. 7 is a vertical sectional view, on an enlarged scale, taken along line 7—7 of FIG. 5.

DESCRIPTION OF THE PREFERRED EMBODIMENT

Figures 1, 2:
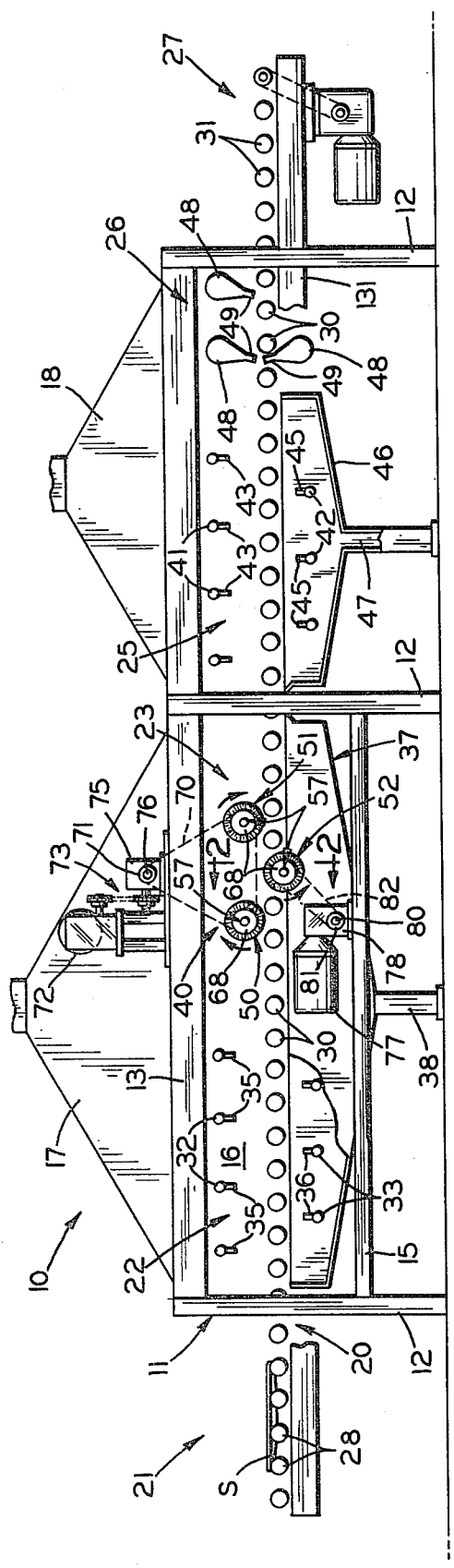
FIG. 1 is a diagrammatic side elevational view of a glass washing apparatus embodying the novel features of this invention.
FIG. 2 is a vertical sectional view, on an enlarged scale, taken along the line 2—2 of FIG. 1.

Referring now in detail to the illustrative embodiment depicted in the accompanying drawings, there is shown diagrammatically in FIG. 1 a glass sheet washing apparatus, comprehensively designated 10, constructed in accordance with this invention and which is especially adapted to thoroughly cleanse the opposite surfaces of curved glass sheets. While apparatus 10 of this invention will be described in connection with the cleaning of curved glass sheets, it should be understood that such apparatus is in no way limited thereto, but has utility in cleaning any substantially rigid sheet material of a curved configuration where it is desired to completely cleanse the opposite surfaces thereof.

The apparatus 10 comprises a frame 11 including a plurality of upright support columns 12 connected at their upper ends to longitudinally extending, horizontal structural members 13 and intermediate their upper and lower ends to longitudinally extending, horizontal structural members 15. Suitable transversely extending cross members (not shown) are welded or otherwise fixedly secured at their respective opposite ends to the structural members 13 and 15 to form a rigid, box-like structure. The enclosing walls of apparatus 10 include opposite side walls 16 (only one of which is shown in FIG. 1), suitable end walls (not shown) with entry and exit openings therein, respectively, for the passage of glass sheets therethrough, and a roof in the form of a pair of exhaust hoods 17 and 18 to accumulate or collect and remove any steam or other deleterious vapors and/or gases generated during the washing and rinsing operations.

The apparatus 10 includes a continuous conveyor system, generally designated 20, adapted to support a plurality of glass sheets S in a generally horizontal plane for movement along a continuous, substantially horizontal path from a loading station 21 through a wetting station 22, a scrubbing station 23, a rinsing station 25, a drying station 26 and finally to an unloading station 27. The apparatus 10 can be employed as an "in-line" operation whereby the apparatus 10 forms a part of a continuous production or laminating line and is located in the path of oncoming bent sheets or as an "off-line" operation whereby bent or curved sheets of glass are removed from a glass fabricating or any other production operation and placed onto the conveyor system 20 at loading station 21.

In the illustrative embodiment, curved glass sheets S are individually loaded on and supported in a generally horizontal plane on longitudinally spaced conveyor rolls 28, forming a part of the conveying system 20, and which are located adjacent the entrance end of the washing apparatus 10. The sheets S are then advanced into apparatus 10 and are transferred from conveyor rolls 20 onto a second series of longitudinally spaced conveyor rolls 30, also forming a part of conveying system 20, and which will hereinafter be described in detail. The series of rolls 30 support the glass sheets S horizontally for movement within the washing apparatus 10 during the cleansing operation and convey them to the unloading station 27 whereat the sheets are transferred onto a third series of longitudinally spaced conveyor rolls 31.

The washing or wetting station 22 includes a plurality of longitudinally spaced, transversely extending upper and lower manifolds 32 and 33 disposed above and below the horizontal path of movement of the glass sheets and connected to a suitable source (not shown) of cleansing liquid, such as water for example. The manifolds 32 and 33 are provided with a plurality of nozzles 35 and 36 for discharging streams of this cleansing liquid against the opposite surfaces of the curved sheets moving along the horizontal path on conveyor rolls 30. These curved sheets are advanced between the nozzles 35 and 36 at a speed promoting the proper rate of wetting prior to entering the scrubbing station 23. In the specific embodiment illustrated, it is only necessary to wet the opposite surfaces of the sheets and accordingly, plain water only is utilized as a wetting agent. Where the sheets are being conditioned for a coating operation, various detergents and/or chemical solutions, including acids, may be emitted from the nozzles 35 and 36 to remove all particulates, stains, oil films or the like. The vapors or gases generated during this operation are efficiently removed via exhaust hood 17 while the liquids are collected in a basin 37 and discharged through an outlet 38 to a suitable drainage piping system.

After being sprayed, the curved sheets S are advanced through the scrubbing station 23, which embodies a plurality of novel brushes of this invention and which will hereinafter be more fully described, the brushes being arranged in a cluster 40. As will hereinafter become apparent, the brush cluster 40 is effective to thoroughly cleanse the entire opposite surfaces of the sheets S.

After brushing, the sheets S are conveyed through the rinsing station 25, which includes a series of longitudinally spaced, transversely extending upper and lower manifolds 41 and 42 disposed above and below the horizontal path of movement of the glass sheets S and connected to a suitable source of water. The manifolds 41 and 42 are provided with a plurality of nozzles 43 and 45 for discharging streams of rinse water against the opposite surfaces of the curved sheets S moving along the horizontal path on conveyor rolls 30. The vapors and/or gases are removed via exhaust hood 18 and the liquid effluent is collected in the basin 46 and discharged through outlet 47 into a suitable drainage piping system.

After rinsing, the curved sheets S are advanced through the drying station 26 whereat are mounted a pair of longitudinally spaced, transversely extending upper air blowers 48 above the path of movement of the glass sheets S and a lower air blower 48 disposed below such path to direct opposed curtains of air under pressure against the opposite surfaces of the sheets passing therebetween. Each blower 48 comprises a tubular body connected to a suitable source of air under pressure (not shown) and having a reduced outlet end portion or slotted nozzle 49 angled slightly forwardly and extending transversely across the entire width of the sheets. These blowers 48 are effective to remove any residual surface water from the opposite surfaces of the sheets and for completely drying the same.

Finally, the clean and dried curved glass sheets S are advanced through an exit opening formed in the rear end wall of the apparatus enclosure and transferred from conveyor rolls 30 onto conveyor rolls 31 at the unloading station 27 whereat the sheets are either removed or, if an "in-line" operation, are advanced to the next stage of operation in the fabricating or laminating process.

In accordance with this invention, the cluster 40 comprises three elongated, specially configurated brushes extending transversely of the path of movement of the glass sheets and engageable with the opposite surfaces of said sheets across the entire widths thereof. The cluster 40 includes a pair of longitudinally spaced, transversely extending upper brushes 50 and 51 disposed above the path of movement of the curved glass sheets S and a lower transversely extending brush 52 disposed therebelow. The axis of the lower brush 52 is disposed in a vertical plane substantially midway between the vertical planes cut through the axes of the upper brushes 50 and 51. While preferably three brushes 50–52 are employed in the preferred embodiment of this invention, it should be appreciated that only two brushes i.e., an upper brush and a lower brush, can be utilized within the purview of this invention. In such case, the brushes can be mounted in an opposed relation with their axes in a common vertical plane or in vertical planes slightly laterally offset from each other.

As best shown in FIG. 2, each brush 50, 51 and 52 comprises straight opposite end portions 53 and 55 having a common horizontal axis and an arcuately curved central portion 56 joining the two straight end portions 53 and 55. Since the construction of the three brushes 50,51,52 are identical in construction, it is believed that a detailed description of only one brush, for example brush 50, will suffice for all three, the same reference characters being applied to identical parts.

Figure 3:
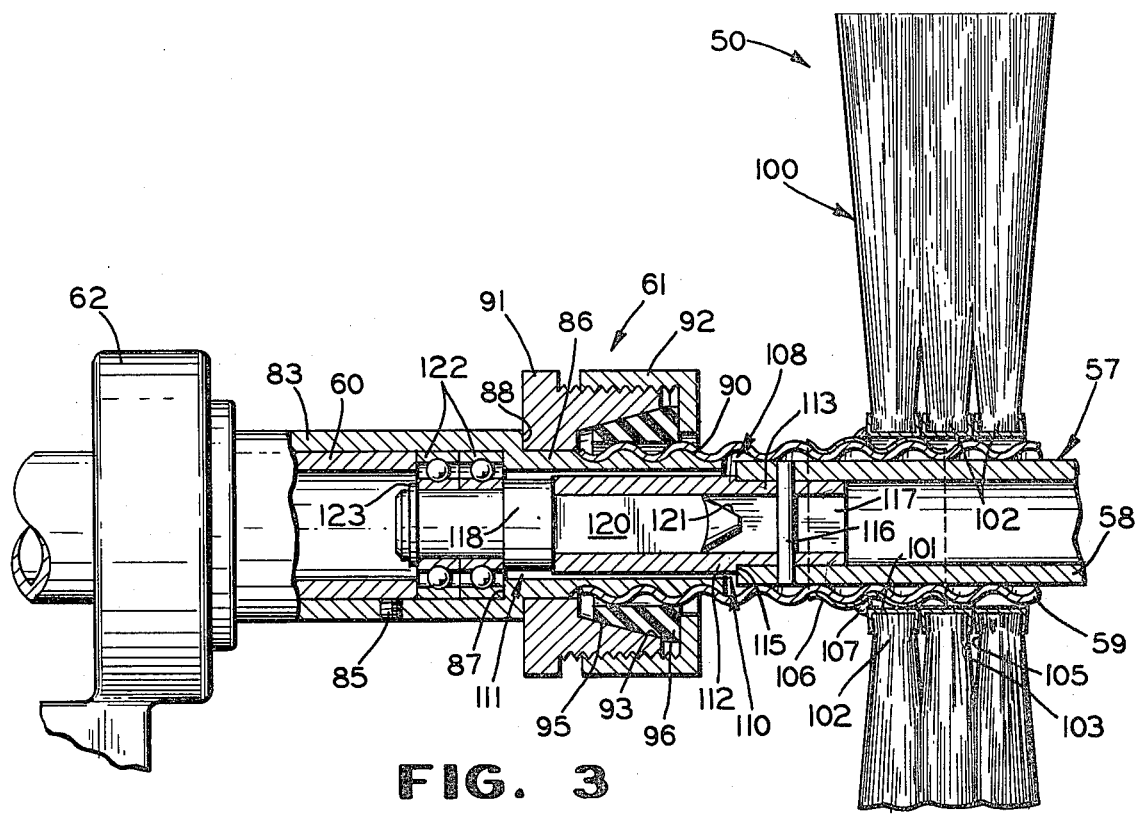
FIG. 3 is an enlarged, fragmentary, vertical sectional view, showing details of the composite shaft of a brush constructed in accordance with this invention.

Referring now to FIG. 3, brush 50 is mounted on a composite, two-piece shaft, generally designated 57, comprised of an inner, hollow, substantially stationary core member 58 and an outer, flexible, rotatable sleeve 59 onto which the bristles of the brush are mounted as will hereinafter be more fully described. To facilitate rotation of the outer sleeve 59 about core 58, the former may be comprised of a convoluted liner formed of a suitable anti-friction material, such as fluorocarbon resin for example, covered with a layer of stainless steel mesh to reinforce the same and prevent kinking thereof. While the outer sleeve 59 is flexible for conforming to the arcuate shape of the inner core 58, it is capable of transmitting torque without significant axial twist or distortion.

The drive end of the outer sleeve 59 of each brush is coupled to a rotatable tubular drive member 60 for rotation therewith by a coupling, generally designated 61. The drive member 60 is journalled for rotation in bearings 62 and 63 (FIG. 2) mounted on the web 65 of a suitable channel member mounted on the frame 11 of apparatus 10 exteriorly of one of the side walls 16, and is provided with a sprocket 68 rigidly secured to the drive member 60. The sprockets 68 of the two upper brushes are driven by a common drive chain 70 (FIG. 1) suitably trained about a drive sprocket 71.

The means for driving chain 70 and thereby rotating the brushes 50 and 51 includes an electric motor 72 energized by a suitable source of electric power and connected via sprocket chain assembly 73 and a gear reducer 75 to a drive shaft 76 upon which is rigidly secured the drive sprocket 71. The lower brush 52 is independently driven by an electric motor 77 connected via gear reducer 78 to an output shaft 80 provided with a drive sprocket 81. The drive chain 82 is trained about drive sprocket 81 and the sprocket 68 of the brush 52. Thus, the upper brushes 50 and 51 are rotated in unison by a common drive train while the lower brush 52 is independently driven by a separate drive train. Preferably, all three brushes are driven at the same rate of speed and, if desired, could be rotated by a common drive.

Referring again to FIG. 3, each coupling 61 is mounted on a tubular drive extension 83 secured to drive member 60 as by suitable set screws 85 for rotation therewith. The tubular drive extension 83 is formed with a reduced diameter portion 86 defining inner and outer shoulders 87 and 88. The reduced diameter portion 86 is formed with an outer convoluted surface 90 received in the complementary shaped end portion of sleeve member 59. Coupling 61 also includes an externally threaded male member 91 seated against shoulder 88 and adapted to receive an internally threaded female connector member 92 disposed about the sleeve member 59 for attaching the latter to tubular drive extension 83.

The internal wall surface 93 of male member 91 is tapered inwardly to engage the outer, conically shaped, complemental surface 95 of a gripping sleeve 96 having a bore for receiving sleeve member 59 therethrough. The gripping sleeve 96 is formed of rubber or any other suitable resiliently yieldable, elastomeric material and when compressed radially, exerts a radial clamping force on the sleeve member 59. The rear end of gripping sleeve 96 is flat and bears against the rear end wall of female connector member 92.

In attaching the outer sleeve 59 to the tubular drive extension 83, the reduced diameter end portion 86 is threaded or otherwise received in the open end of sleeve 59. The female connector 92 is then threaded onto the male member 91, urging the gripping sleeve 96 radially inwardly for clamping the outer rotatable sleeve 59 against the end portion 86 of drive extension 83. In this manner, the outer sleeves 59 of the several brushes are attached to their respective drive extensions 83 for rotation about their own chordal axes, respectively, relative to their associated inner cores 58. The couplings 61 facilitate quick and easy removal and/or replacement of the brushes when desired or required.

The brush element, identified generally by numeral 100, comprises a multiplicity of bristles secured within a flexible, metallic channel 101 spirally wrapped about the rotatable sleeve 59 in a manner providing adjacent convolutions or segments 102 (FIG. 3) having opposed faces 103 and 105 compressed against each other to form the brush element 100. Of course, adjacent convolutions or segments 102 may be spaced from each other at selective distances, if desired, to form any spiral pattern desired. This element 100 is rigidly secured at each of its opposite ends to the rotatable sleeve 59 by means of a corrugated ferrule 106 affixed to the outer surface of the complementary shaped sleeve 59 and silver soldered, as at 107, or otherwise fixedly secured to the outermost end faces of the metallic channel 102.

It should be understood that the degree of curvature imparted to the central portions 56 of brushes 50-52 is dictated by the curvature of the glass sheets being scrubbed thereby. The brushes can be bent to any geometrical form, including angular or V-shaped bends to conform to the shape of the bent glass sheet being processed in a given production line. Once bent to a desired shape, the brushes, together with their composite shafts 57, are sufficiently rigid to remain set in their shape and will not be deformed out of said shape by the passage of glass sheets therebetween.

In order to significantly change the curvature of the brushes, they must be removed from their mountings. However, rather than remove the entire brush, it is only necessary to remove the core member 58 of the composite shaft 57 and replace it with a core member 58 of the desired configuration since the sleeve 59 will assume the curvature imparted to the core member 58. In order to facilitate core removal and replacement, each core member 58 adjacent the drive end of the brush is provided with a quick connect-disconnect coupling assembly, generally designated 108 (FIG. 3). Such an assembly 108 includes the tubular drive extension 83 which serves as a casing or housing therefor and further comprises a first coupling section 110 secured to one end of each inner core member 58 and a second coupling section 111 mounted within the tubular drive extension 83 which rotates relative to the coupling section 111. Coupling section 110 comprises a cylindrical body 112 having a reduced diameter portion 113 separated by an angular shoulder 115. This reduced diameter portion 113 is telescopically received within the bore of core member 58 and fixedly secured therein by means of a pin 116 with the shoulder 115 abutting against the end face of core member 58. Coupling section 110 is provided with a socket in the form of a bore 117 of square or flat-sided configuration extending therethrough for receiving a complementary shaped male member of the other section 111, as will presently become apparent.

Coupling secton 111 comprises an elongated body 118 mounted in the tubular drive extension 83 and includes a flat-sided lug 120 of substantially square cross sectional configuration adapted to fit into the complementary shaped socket or bore 117 of coupling section 110. The forward end of lug 120 is tapered, as shown at 121 in FIG. 3, to facilitate insertion thereof into the socket 117. A pair of abutting bearings 122 are mounted on a reduced diameter portion of body 118 to permit rotary movement of the tubular drive extension 83 relative to coupling section 111. A suitable retaining ring 123 holds the bearings 122 in place. The bearings also are fixed in position between annular shoulder 87 and the end face of drive member 60.

The idle end of each core member 58 is fixedly secured within one end of a horizontally extending plate 125 having a right angularly related bracket 126 rigidly secured to the lower edge thereof. The bracket 126 is formed with an opening therethrough for receiving a screw 127 threaded through a nut 128 fixedly secured to the upper surface of the bracket 126. The lower end of screw 127 rests on a base plate 130 rigidly secured, as by bolts 129, to an elongated rail forming a part of the apparatus frame 11. The other end of the plate 125 is rigidly secured to a shaft 132 journalled for rotation within a suitable aperture 133 formed in an upright support block 135 welded or otherwise fixedly secured onto the base plate 130. A collar 136 is suitably mounted on the shaft 132, as by means of a setscrew 137, to prevent axial outward movement of the shaft 132 through aperture 133. Thus, the idle end of each brush is mounted, as by the above described arrangement, for pivotal movement about a common axis defined by the straight opposite end portions of core member 58 to effect slight changes in the curvature of the central portion 56 of the associated brush. The screw 127 can be turned within nut 128 to effect such pivotal movement of the core member 58 and thereby selectively change the curvature of the brush central portion 56 within a limited range in order to accommodate curved glass sheets of slightly more or less pronounced curvatures without having to remove the core member or disassembling any of the other components.

Figure 4:
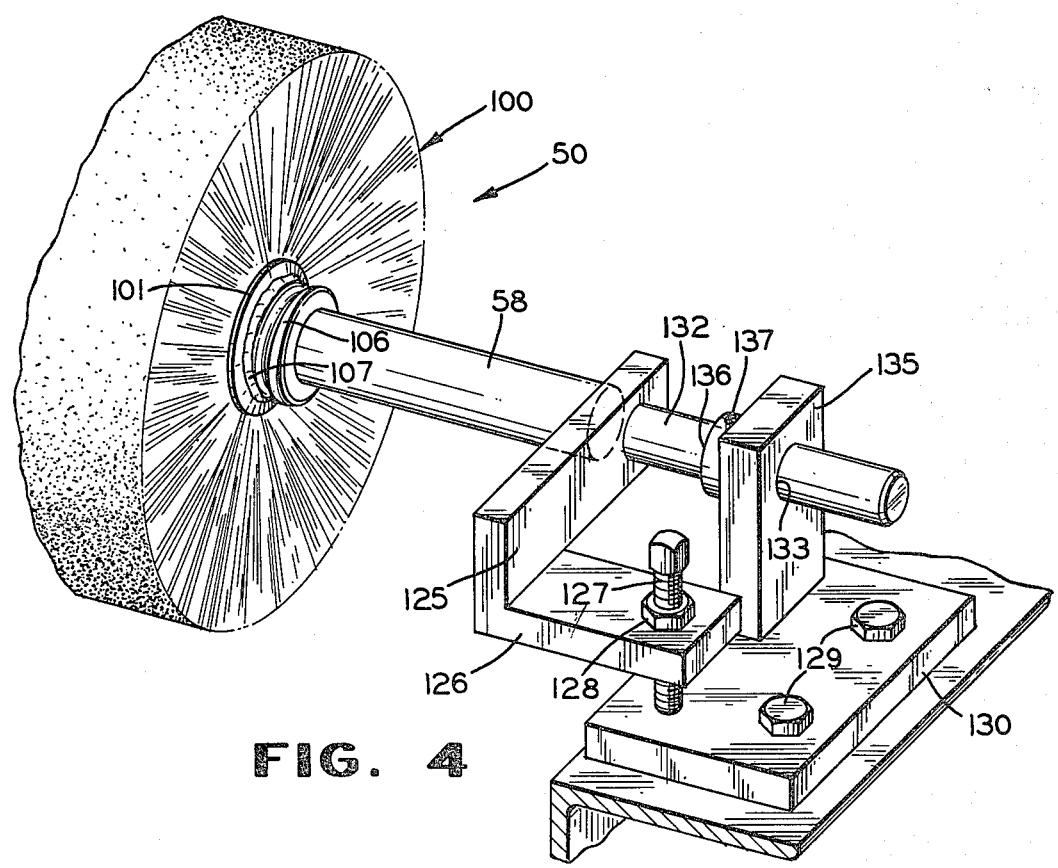
FIG. 4 is a fragmentary, perspective, enlarged view of the idle end of each brush assembly.

As earlier mentioned, when a major change in brush curvature is required, such as would be occasioned by a severe change in the transverse configuration of the glass sheets to be washed, the core member 58 only need be replaced. To this end, the hold-down bolts 129 (FIG. 4) are removed to permit removal of the block 135 axially from shaft 132 and thereby free the entire idle end of the brush. The core member 58 can then be pulled axially away from the drive end of the brush to disengage coupling section 110 from coupling section 111 and withdraw core member 58 from within sleeve 59, the latter remaining intact in its original position and connected via coupling 61 to the drive train. The coupling section 111 stays fixedly secured within tubular drive extension 83 while coupling section 110 is withdrawn along with core member 58. Upon removal, a differently shaped core member having a coupling section 110 therein can be expediently inserted in place by reversing the above-described steps, the flexible sleeve 59 and thereby brush element 100, assuming the different contour of the fresh core member 58.

Referring now to FIGS. 5–7, the conveyor rolls 30 employed to support and convey the curved glass sheets S through the enclosure of the washing apparatus 10 are similar in construction to the composite shaft 57 of the brushes 50–52 except that they are provided with longitudinally spaced discs 140 rather than brush elements 100. Also, the idle end of these rolls 30 are mounted differently from the idle end of shafts 57. Otherwise, the rolls 30 are identical in construction to and are driven in the same manner as shafts 57 and the same reference numerals primed will be applied to similar parts.

As best shown in FIG. 6, each disc 140 is preferably formed of a somewhat resiliently yieldable elastomeric material, such as urethane for example. It should be understood that other synthetic plastics exhibiting similar characteristics can be used in lieu of urethane, if desired. Each disc 140 comprises an annular body 141 having generally planar axial end faces 142 and 143. The disc body 141 has an inner circumferential bearing surface 145 adapted to be secured to the rotatable sleeve 59' with a friction fit and an outer circumferential surface 146 terminating at its opposite ends in annular flanges 147 and 148. A pair of axially spaced O-ring elements 150 and 151 are disposed about the outer circumferential surface 146 of disc 140 adjacent the flanges 147 and 148 thereof. These O-ring elements, which are the only elements engaging the bottom surfaces of the glass sheets conveyed by rolls 30, are formed of a relatively soft, resiliently yieldable material, such as rubber for example, to preclude marring or scratching of the glass sheet surfaces. The use of these O-ring elements 150 and 151 also minimizes the contact between the conveyor rolls and the sheets to permit maximum contact of the cleansing liquid, rinse water and drying air against the bottom surfaces of the sheets.

The idle end of each core member 58 remote from the drive telescopically receives a stub shaft 152. The stub shaft 152 of each conveyor roll 30 is provided with a sleeve 153 of generally square configuration in cross section secured in an upright mounting block 155 affixed to a base plate 156 supported on a suitable structural member forming a part of the apparatus frame 11. The bracket 155 is formed at its upper end with a V-shaped groove 157 for receiving the complementary shaped sleeve 153 of stub shaft 152. The stub shaft 152 is held in place by means of an inverted L-shaped clamping bracket 158 mounted for pivotal movement about a horizontally extending pivot pin 160 mounted on the block 155. The bracket 158 is held in a clamping position about the sleeve 153 by means of a threaded stud 161 secured at its lower end to a pivotal lug 162 mounted on the block 155 and adapted to be swung into an upright position for reception in a U-shaped groove 163 formed in the upper horizontally extending portion of bracket 158. A wing nut 165 is threaded onto the free end of stud 161 for clamping the bracket 158 against the sleeve 153 of stud shaft 152 to secure the same in place.

From the foregoing, it is apparent that the objects of the present invention have been fully accomplished. As a result of this invention, an improved washing apparatus embodying a novel brush assembly is provided for thoroughly cleansing the opposite surfaces of curved or contoured sheet material. The brush assembly comprises a plurality of specially configurated brushes having contours complementary to the shape of the articles being cleansed and which are engageable with the opposite surfaces of the curved articles across the entire widths thereof. Each of the brushes is mounted on a curved or bent composite shaft comprised of a stationary inner core member shaped to the desired configuration and a driven flexible sleeve adapted to assume the shape of the core member and which is rotatable relative to the core member about its own chordal axis. The brush element is mounted directly on the sleeve and assumes the same configuration as the two-picee, composite shaft.

It is to be understood that the form of the invention herewith shown and described is to be taken as an illustrative embodiment of the same, and that various changes in the shape, size and arrangement of parts may be resorted to without departing from the spirit of the invention.

We claim:

1. An apparatus for washing curved glass sheets comprising: a frame, a cluster of brushes mounted on said frame and including at least a pair of opposed rotary brushes above and below the path of movement of a curved glass sheet advanced therebetween, each of said brushes having bent central portions conforming to the shape of the glass sheets being washed, each of said brushes mounted on a composite shaft formed of a fixed, bent inner core member and an outer, flexible rotatable sleeve, and means for rotating said sleeves about said inner core members, respectively.

2. Apparatus according to claim 1, wherein said cluster includes a pair of longitudinally spaced upper rotary brushes above said path of movement and a lower rotary brush below said path of movement, the axis of said lower brush lying in a vertical plane intermediate the vertical planes of the axes of said upper rotary brushes, respectively.

3. Apparatus according to claim 1, wherein each of said brushes includes a brush element comprised of a multiplicity of bristles rigidly secured to said rotatable sleeve.

4. Apparatus according to claim 3, wherein said brush element comprises an elongated, flexible channel member having a multiplicity of bristles secured therein, said channel member being specially wrapped about said sleeve to form adjacent convolutions along the length of said sleeve, and means securing said channel member to said sleeve.

5. Apparatus according to claim 1, including means for detachably coupling said core member to said sleeve for withdrawal of said core member from said sleeve.

6. Apparatus according to claim 1, in combination with a plurality of conveyor rolls for advancing a glass sheet in a generally horizontal path between said brushes.

7. The combination according to claim 6, wherein each of said conveyor rolls is provided with a plurality of longitudinally spaced discs for supporting said glass sheet during the advancement thereof.

8. The combination according to claim 7, wherein each of said discs is formed of an annular body having a circumferential surface provided with annular flanges adjacent the opposite axial ends of said surface.

9. The combination according to claim 8, including a pair of O-rings disposed about said circumferential surface against said flanges, respectively.

10. The combination according to claim 8, wherein said annular body is formed of a resiliently yieldable elastomeric material.

* * * * *

UNITED STATES PATENT AND TRADEMARK OFFICE
CERTIFICATE OF CORRECTION

PATENT NO. : 4,352,221
DATED : October 5, 1982
INVENTOR(S) : Robert G. Revells & John N. Eggert It is certified that error appears in the above-identified patent and that said Letters Patent are hereby corrected as shown below:

Col. 1, line 30, "enlarged" should be --salvaged--

Signed and Sealed this

Eighth Day of February 1983

[SEAL]

Attest:

GERALD J. MOSSINGHOFF

Attesting Officer

Commissioner of Patents and Trademarks